United States Patent [19]

Stewart

[11] Patent Number: 5,444,584
[45] Date of Patent: Aug. 22, 1995

[54] VIDEO CASSETTE TAPE PROTECTION DEVICE CONSISTING OF AN ENCLOSURE HAVING WALLS SUBSTANTIALLY BOUNDING THE TAPE PATH IN A VIDEO CASSETTE PLAYER/RECORDER

[75] Inventor: David S. Stewart, Palatine, Ill.

[73] Assignee: Zenith Electronics Corporation, Glenview, Ill.

[21] Appl. No.: 175,902

[22] Filed: Dec. 27, 1993

[51] Int. Cl.⁶ .............................................. G11B 5/027
[52] U.S. Cl. .................................. 360/85; 360/130.22
[58] Field of Search ............... 360/85, 95, 84, 130.22, 360/130.24, 132

[56] References Cited

U.S. PATENT DOCUMENTS

| 3,692,256 | 9/1972 | Kember | 242/198 |
| 4,803,574 | 2/1989 | Konishi | 360/96.5 |
| 5,140,487 | 8/1992 | Tanaka et al. | 360/85 |
| 5,285,332 | 2/1994 | Konishi et al. | 360/85 |

Primary Examiner—A. J. Heinz
Attorney, Agent, or Firm—Roland W. Norris

[57] ABSTRACT

A video cassette protection device forms a smooth enclosure adjacent the tape path of the mechanical tape drive mechanisms in order to prevent tape runaway. The protection device also prevents tape damage should runaway occur by providing a smooth cache in which to store accumulated runaway tape. The device will also make tape machine maintenance easier should the tape runaway.

14 Claims, 3 Drawing Sheets

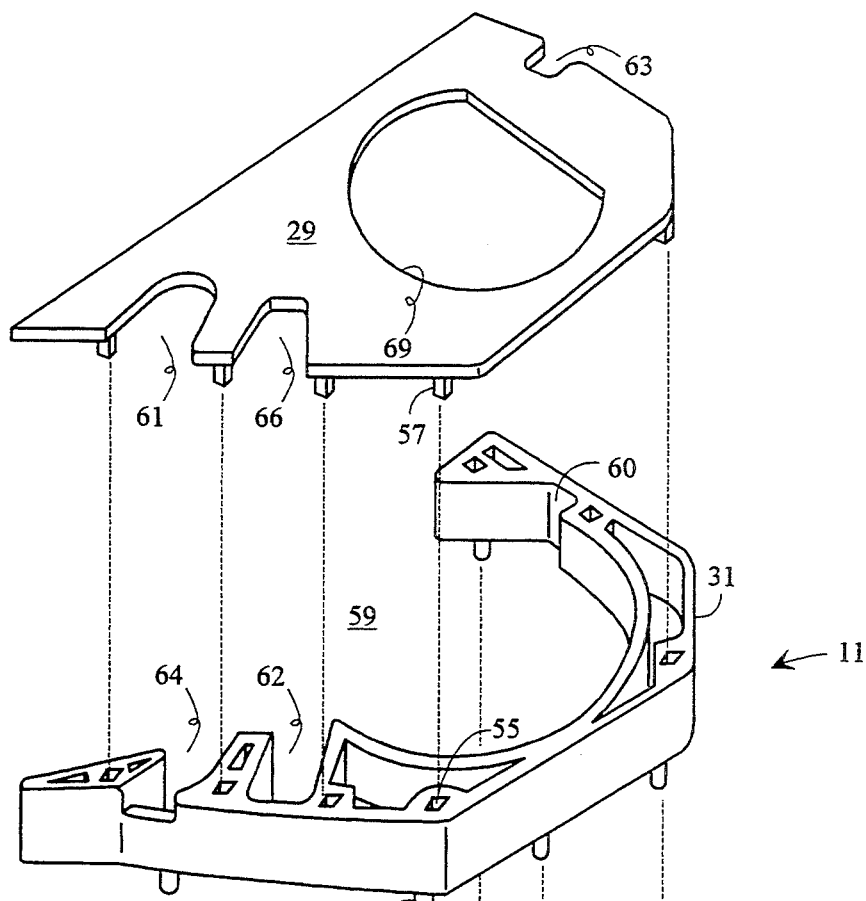
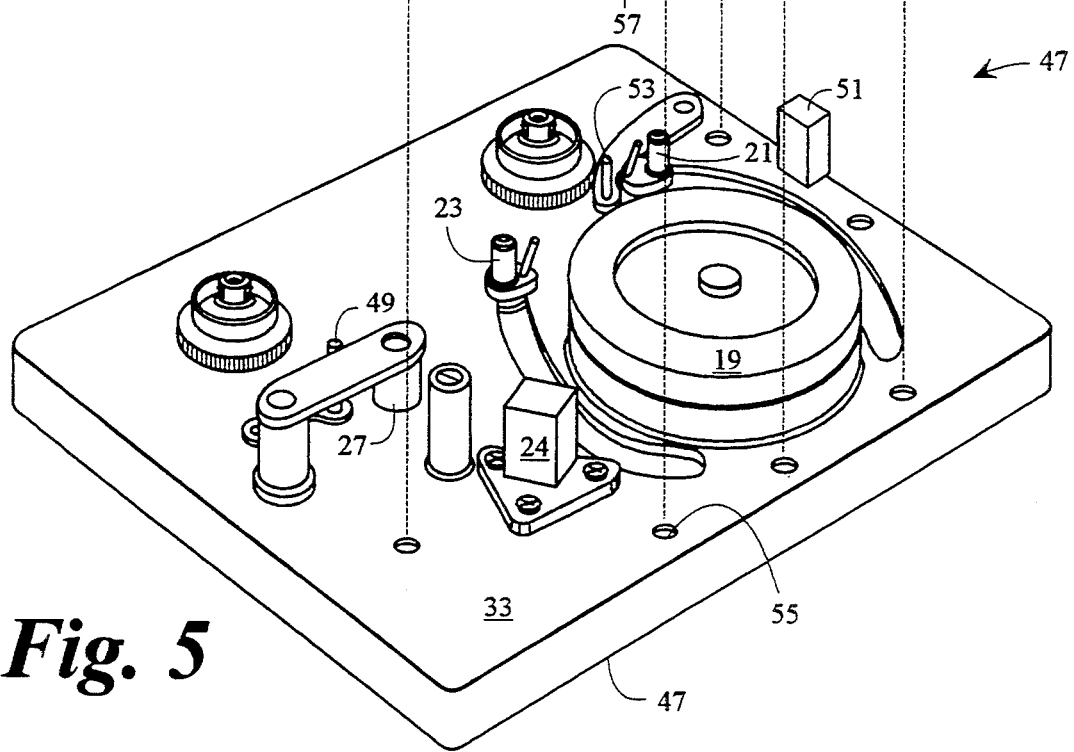

VIDEO CASSETTE TAPE PROTECTION DEVICE CONSISTING OF AN ENCLOSURE HAVING WALLS SUBSTANTIALLY BOUNDING THE TAPE PATH IN A VIDEO CASSETTE PLAYER/RECORDER

BACKGROUND OF THE INVENTION

1. Field Of The Invention

The present invention relates generally to video cassette recorder/players. The present invention relates specifically to means for minimizing tape runaway within the mechanical tape transport and means to reduce the possibility of damage to the tape. The present invention also eases removal of tape and reduces machine repair if tape runaway does occur.

2. Discussion Of The Related Art

When a video cassette tape is recorded or played by a contemporary video cassette recorder (VCR) there is a great deal of tape introduced into the machine. The tape, on following its path through the machine, contacts several different surfaces. Should the tape stick, instead of flowing smoothly past these surfaces, or for any number of other reasons, the tape may exit the tape path. This condition will hereinafter be referred to as "runaway". If the tape drive mechanism continues to operate while the tape is out of the tape path, the tape may backup all over the inside of the VCR and climb out of the normal plane of the tape path, thus winding itself around and catching behind one or more of the vertical members of the tape path or other parts in the interior of the VCR case. Such an occurrence will very likely result in tape damage and could also result in a need for servicing the VCR. Obviously, such a situation is undesirable for reasons of expense and inconvenience. Also, precious one-of-a-kind images could be lost with the mangled tape.

It is, therefore, among the objects of the present invention to provide a simple and inexpensive device adaptable to the mechanical playback mechanism of the contemporary VCR in order to keep tape runaway from happening and to minimize damage to the tape and ease machine repair if the runaway does happen.

BRIEF DESCRIPTION OF THE DRAWINGS

Other attendant advantages will be more readily appreciated as the invention becomes better understood by reference to the following detailed description and compared in connection with the accompanying drawings in which like reference numerals designate like parts throughout the figures. It will be appreciated that the drawings may be exaggerated for explanatory purposes.

FIGS. 3-5 represent an exploded view of an alternative embodiment of the tape protection device shown with the VCR tape drive mechanism.

DETAILED DESCRIPTION OF THE PREFERRED EMBODIMENT

Figure 1:
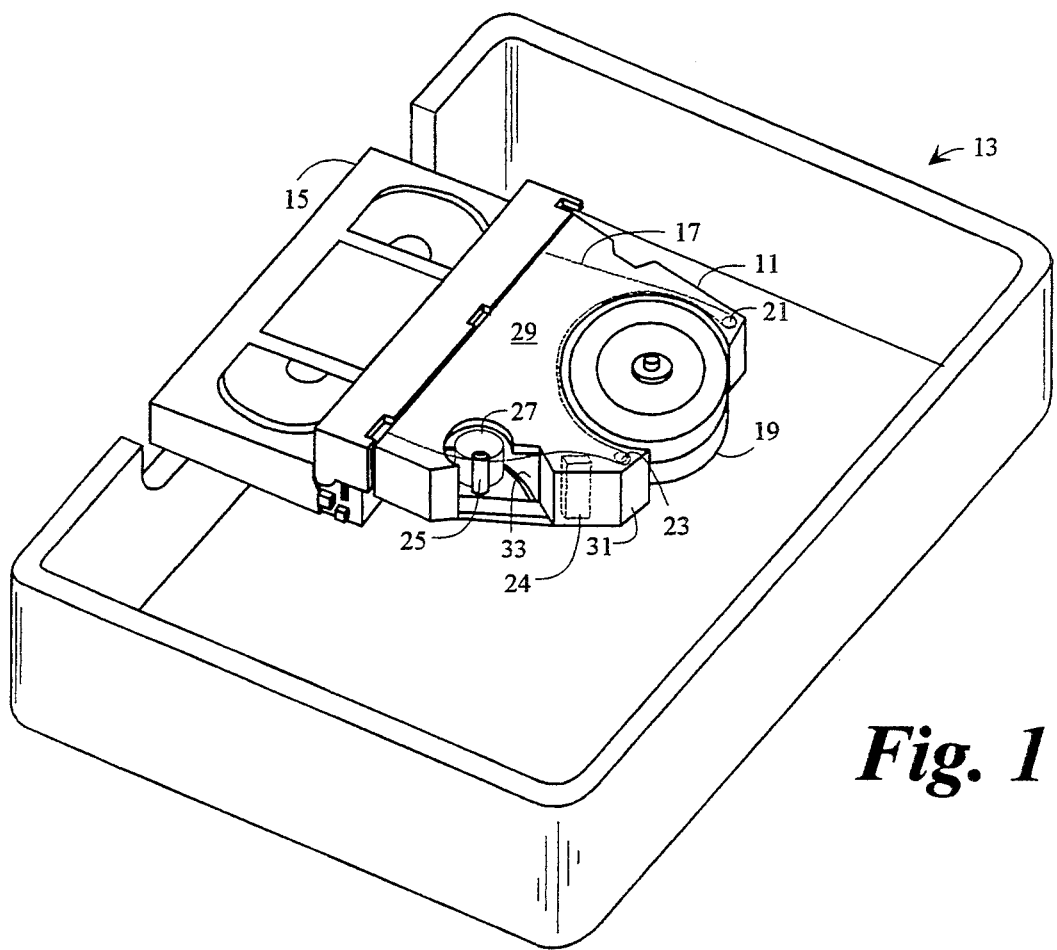
FIG. 1 is a perspective schematic view of the bottom half of a VCR with a video cassette tape and a tape protection device according to the present invention therein.

As seen in FIG. 1, a video cassette tape protection device 11 is a molded box of plastic material that is housed within a video cassette recorder/player (VCR) 13. The VCR 13 has its top removed in order to more clearly explain the present invention. A open video cassette 15 is shown in place abutted against the tape protection device 11. The tape 17, indicated by a dashed line, is shown in its normal operational path as extended around the rotary read/write head containing drum 19 by first and second tape threading arms 21 and 23 respectively. The tape 17 then passes over an audio and control head assembly 24 and between a capstan 25 and an overhead-type pinch roller 27 which is only partially shown, but will be understood by the artisan to include the lifting and placing armature mechanisms necessary to place the pinch roller 27 on the nonoxide side of the tape, as is well known in the art. It will be understood by the artisan that the present invention will work equally well with a nonoverhead pinch roller of the type contacting the oxide side of the tape. The view of FIG. 1 illustrates the tape protection device 11 with its top cover 29, side walls 31, and bottom wall 33. All of these components comprising the tape protection device 11 are constructed and arranged so as to urge the tape into its appropriate path and keep it at the appropriate level while providing smooth surfaces which do not damage the tape, should runaway occur.

Figure 2:
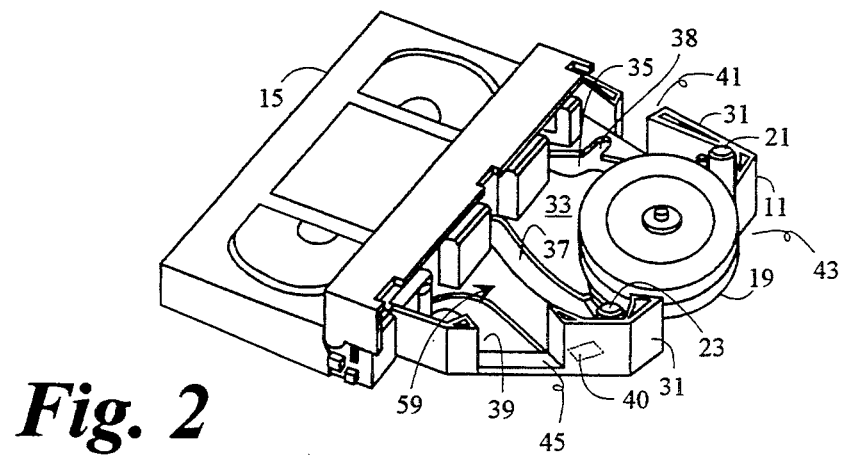
FIG. 2 is a perspective schematic view of the video cassette and the tape protection device of FIG. 1 with the top cover removed.

As seen in FIG. 2, illustrating only the video cassette 15 and the protection device 11 with its top cover 29 removed, the bottom wall 33 is designed to be placed over the mechanical tape transport deck assembly (not shown) which will be understood by the artisan to have a variety of protuberances and catch points which may damage the tape or send the runaway tape into undesired paths. The bottom wall 33 is preferably arranged to have its inner surface, i.e., the visible surface next to the tape path, at a level just below that of the bottom edge of the tape in its ordinary operating position. The bottom wall 33 has first and second cutouts 35 and 37 respectively for allowing passage of the first and second tape threading arms 21 and 23 respectively in their normal operational manner. The first cutout 35 also allows for movement of an erase head tension arm (not shown) through a spur cutout 38 thereon. A third cutout 39 is provided for operational movement of a pinch roller tension arm, which is not shown but is included with some varieties of pinch roller assemblies such as seen in FIG. 5, reference number 49. A fourth cutout 40 allows for passage of the audio and control head assembly therethrough.

Affixed to the bottom wall 33, and extending orthogonally therefrom, are side walls 31. The side walls are segmented so as to create first through third apertures 41, 43 and 45 respectively, as necessary for access of the erase head 51, rotary drum 19 and pinch roller 27 components operating on the tape as further explained below. Openings in, and clearances of, the side walls are kept to a minimum to prevent loops of runaway tape from escaping the confines and level, or plane, of the protection device 11.

As seen in the exploded view of FIGS. 3—5, one embodiment of the invention is constructed and arranged so that the top cover 29 and side walls 31 are removably snapped together. In the embodiment of FIG. 3, the bottom wall 33 is formed as a close fitting cover for all parts of the mechanical deck assembly 47 and removably receives the side walls 31. Tape path components of the mechanical deck assembly illustrated include the previously mentioned first and second tape threading arms 21 and 23 respectively shown in their withdrawn positions, rotary drum 19, the audio and control head assembly 24, the overhead pinch roller 27 with its associated tension arm 49, and an erase head 51 with its associated tension arm 53. Each of the top cover 29, side walls 31, and bottom wall 33/mechanical deck assembly 47 are fitted together with an appropriate slot 55 and tab 57 arrangement, although other removable joinery such as screws, or the like, may be utilized. When the components of the tape protection device are snapped together in abutting relation, a cache area 59 is formed for caching any runaway tape which may accumulate inside the protection device 11 while causing minimal damage to the tape.

By making each of the components of the tape protection device 11 separable from the others, it is believed that ease of access to the cached tape by maintenance personnel will be facilitated. However, it will be seen by the artisan that the bottom and side walls could readily be molded as a single piece, as suggested by FIG. 2.

As further seen in FIG. 4, the side wall 31 is a single structure substantially surrounding the tape path and enclosing the vertical components of the mechanical deck assembly 47. A first recess 60 in the side wall 31 allows the erase head 51 access to the tape when its associated tension arm 53 is in its operational position and the first tape threading arm 21 is in its engaged position whilst keeping the inside surface of the side wall proximate to the tape path. A second recess 62 is formed in the side wall 31 in order to allow the audio and control head assembly 24 access to the tape whilst retaining proximity of the side wall to the tape path. It will also be appreciated by the artisan that unlike the embodiment of FIG. 2, the side wall is extended around the back of the rotary drum 19. A third recess 64 is formed in the side wall 31 to allow access to the tape path for the overhead pinch roller 27. If an overhead pinch roller is not used, the side wall may accommodate the tape path around the pinch roller assembly differently. Access for the overhead pinch roller 27 is also accommodated with a corresponding cutout area 61 in the top wall 29. Top wall 29 further has erase head and audio and control head assembly associated cutouts 63 and 66 respectively formed therein. The top wall 29 is further apertured with a cutout 69 to accommodate the rotary drum 19. All such top wall cutouts are designed to keep the inside surface of the top wall 29 as close to the tape path as possible. It will be appreciated that the side wall may be apertured to allow access of the audio and control head assembly to the tape rather than enclosing the assembly totally, as shown.

Figure 6:
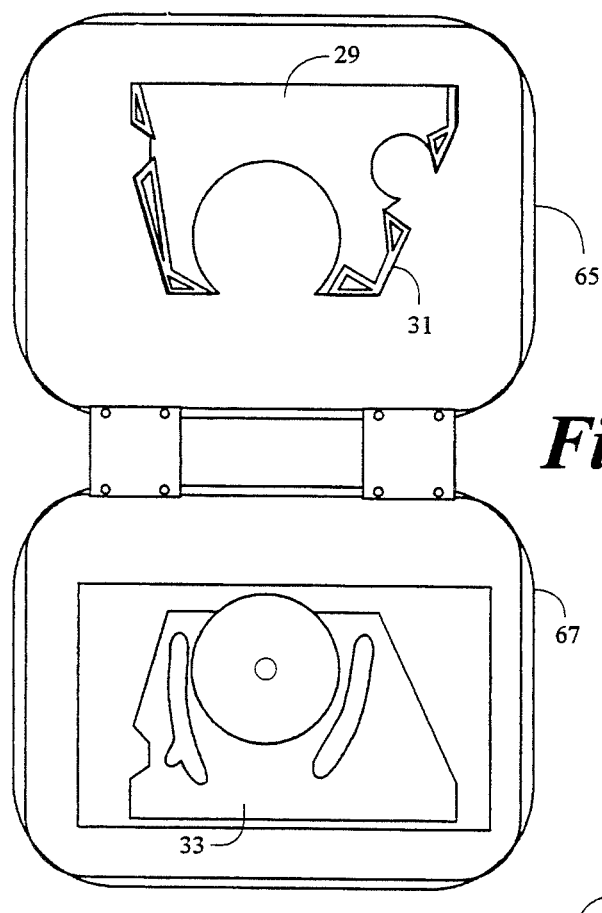
FIG. 6 is a top plan view of a VCR two-piece case illustrating another aspect of the invention.

As seen in FIG. 6 the tape guide could be divided between a top half 65 of the VCR case in the bottom half 67 of the VCR case such that when the top half 65 is connected to the bottom half 67 to form the complete VCR case, the top plate 29 and side walls 31 are placed in operational position over the bottom wall 33 as an aid to the assembly and manufacture of the present invention.

Figure 7:
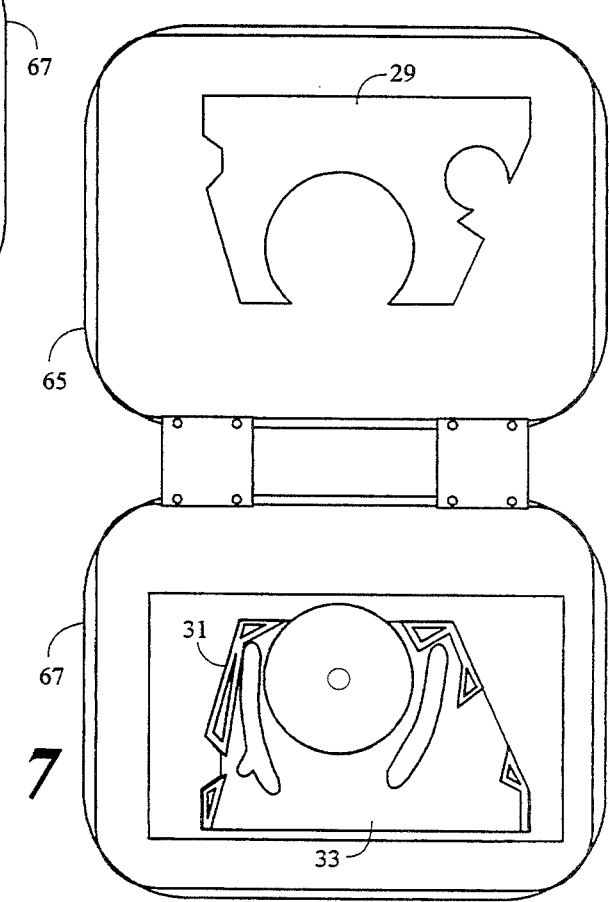
FIG. 7 is a top plan view of a VCR two-piece case illustrating a second other aspect of the invention.

As shown in FIG. 7, as a further alternative, the top plate 29 could be formed in or suspended from the top half 65 of the VCR case. The bottom half 67 of the VCR case contains the bottom wall 33 and side walls 31 such that when the two halves 65 and 67 of the VCR case are ajoined, the top wall is placed in operable relationship to the other parts of the protective device.

While the present invention has been illustrated and described in connection with the preferred embodiments, it is not to be limited to the particular structure shown, because many variations thereof will be evident to one skilled in the art and are intended to be encompassed in the present invention as set forth in the following claims.

What is claimed is:

1. A video cassette protection device comprising:
   a box adapted to be fixedly contained in a VCR case and covering a tape path having a known operating level;
   the box being separate from and extraneous to the tape drive mechanism and configured to have side walls whose inside surfaces are substantially parallel and proximate to the tape path;
   the box further having a top wall having an inside surface abutting the side wall inside surfaces;
   the top and side walls forming a barrier to tape runaway and providing a cache for runaway tape substantially in the operating level of the tape path.

2. The protection device according to claim 1 further comprising:
   a bottom wall having an inside surface abutting the side wall inside surfaces and spaced from the top wall.

3. The protection device according to claim 2 wherein the top wall is removably attached to the side walls.

4. The protection device according to claim 1 wherein the top wall is removably attached to the side walls.

5. The protection device according to claim 1 wherein the side walls are apertured to allow ingress and egress of an overhead pinch roller.

6. The protection device according to claim 1 wherein the side walls are apertured to allow the tape to contact an erase head.

7. The protection device according to claim 2 wherein the side walls are removably attached to the bottom wall.

8. The protection device according to claim 1 wherein the top wall is attached to a top half of the VCR case.

9. The protection device according to claim 1 wherein the side walls are attached to the bottom of the VCR case.

10. The protection device according to claim 1 wherein the protective device is attached to the top half of the VCR case.

11. A video cassette tape playback mechanism comprising:
    a tape transport mechanism including first and second tape threading arms having engaged and withdrawn positions for pulling video tape out of the cassette and engaging the tape with a rotary drum, the rotary drum having the read/record heads for the tape;
    a tape protection device extraneous to the tape transport mechanism having:
    a first side wall of a height approximate to the height of the tape path on the feed side of the tape path and extending from the cassette to just beyond the first thread arm engaged position;

a second wall on the return side of the tape path and extending from the cassette to just beyond the second thread arm engaged position;

a bottom wall with apertures therein to accommodate threading arm movement;

an opening between the first and second side walls to accommodate the rotary drum;

an opening in the first side wall to accommodate an erase head;

an opening in the second side wall to accommodate an overhead pinch roller;

a top wall abutting the first and second side walls and having a planar surface thereof adjacent the top edge of the tape path, whereby the top wall and first and second side walls and bottom wall form restrictive barriers for runaway tape and a cache to accumulate runaway tape within the tape protection device.

12. The protection device according to claim 11 wherein the top wall is attached to the top half of the VCR case.

13. The protection device according to claim 11 wherein the side walls are attached to the bottom of the VCR case.

14. The device according to claim 11 wherein the protective device is attached to the top half of the case.

* * * * *